United States Patent
Kohler et al.

(10) Patent No.: US 9,428,637 B2
(45) Date of Patent: Aug. 30, 2016

(54) POLYPROPYLENE COMPOSITIONS CONTAINING GLASS FIBER FILLERS

(71) Applicant: BASELL POLIOLEFINE ITALIA S.R.L., Milan (IT)

(72) Inventors: Rainer Kohler, Pegnitz (DE); Michele Grazzi, Ferrara (IT); Jurgen Rohrmann, Kelkheim (DE); Giampaolo Pellegatti, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 0 days.

(21) Appl. No.: 14/903,000

(22) PCT Filed: Jun. 24, 2014

(86) PCT No.: PCT/EP2014/063236
§ 371 (c)(1),
(2) Date: Jan. 5, 2016

(87) PCT Pub. No.: WO2015/000738
PCT Pub. Date: Jan. 8, 2015

(65) Prior Publication Data
US 2016/0137824 A1    May 19, 2016

(30) Foreign Application Priority Data
Jul. 5, 2013  (EP) .................................. 13175408

(51) Int. Cl.
*C08L 23/14* (2006.01)
(52) U.S. Cl.
CPC ..................... *C08L 23/14* (2013.01)
(58) Field of Classification Search
CPC ........ C08L 23/08; C08L 23/10; C08L 23/14; C08L 23/16
See application file for complete search history.

(56) References Cited

U.S. PATENT DOCUMENTS

| | | |
|---|---|---|
| 2010/0063207 A1 | 3/2010 | Goberti et al. |
| 2010/0069560 A1 | 3/2010 | Masarati et al. |
| 2012/0225993 A1 | 9/2012 | Bernreitner et al. |

FOREIGN PATENT DOCUMENTS

| | | | |
|---|---|---|---|
| EP | 2 308 923 A1 * | 4/2011 | |
| EP | 2308923 A1 | 4/2011 | |
| EP | 2592111 A1 | 5/2013 | |
| WO | WO 2008/068113 * | 6/2008 | |
| WO | WO 2008/074715 * | 6/2008 | |
| WO | WO-2008068113 A1 | 6/2008 | |
| WO | WO-2008074715 A1 | 6/2008 | |
| WO | EP 2 592 111 A * | 5/2013 | |

OTHER PUBLICATIONS

PCT International Search Report and the Written Opinion Mailed Aug. 27, 2014 for Corresponding PCT/EP2014/063236.

* cited by examiner

*Primary Examiner* — Robert Harlan

(57) ABSTRACT

The present disclosure relates to a composition comprising:
(A) 30-60% by weight of a soft polyolefin composition comprising 10-50% by weight of a copolymer (a) of propylene, which contains from 1-8% by weight of comonomer; 50-90% by weight of a copolymer (b) of ethylene and other alpha-olefin(s) and from 57-80% of ethylene; where the weight ratio of the content of copolymer component (b) to the fraction XS (soluble in xylene) at room temperature (about 25° C.), both (b and XS) referred to the total weight of (a)+(b), is 1.5 or less, and the intrinsic viscosity [η] of the XS fraction is 3 dl/g or more; and the total quantity of copolymerized ethylene is 30-65% by weight;
(B) 5-30% of glass fiber filler;
(C) 0.5%-3% by weight of a compatibilizer; and
(D) 10-40% by weight of a polypropylene component selected from propylene homopolymers, propylene copolymers containing up to 5% by moles of ethylene and/or $C_4$-$C_{10}$ α-olefin(s) and combinations of such homopolymers and copolymers, with a MFR from 0.3 to 2500 g/10 min.

3 Claims, No Drawings

POLYPROPYLENE COMPOSITIONS CONTAINING GLASS FIBER FILLERS

CROSS-REFERENCE TO RELATED APPLICATIONS

This application is the U.S. National Phase of PCT International Application PCT/EP2014/063236, filed Jun. 24, 2014, claiming benefit of priority to European Patent Application No. 13175408.7, filed Jul. 5, 2013, the contents of which are incorporated herein by reference in its entirety.

FIELD OF THE INVENTION

The present technology concerns polypropylene compositions containing glass fiber fillers, having an improved balance of mechanical properties. In particular, the compositions of the present technology have relatively higher stiffness and tensile strength without compromising impact properties or even improving impact at low temperatures, notwithstanding the presence of lower amounts of fillers, associated with a very favorable reduction of density.

BACKGROUND OF THE INVENTION

Glass fiber reinforced thermoplastic polyolefin compounds for injection molding have been developed in the automotive industry for automotive and aerospace interior applications. These materials may be characterized by desirable haptic, sound dampening with a high stiffness and scratch resistance properties and may comprise interior trim components and external parts.

U.S. Pat. No. 6,441,094 discloses impact resistant polyolefin compositions comprising two polymer fractions with different melt flow rate values and a rubbery phase formed by an elastomeric copolymer of ethylene. The polyolefin composition disclosed therein exhibit processability, mechanical and optical properties for injection molding parts. EP Pat. Docs. EP2121829, EP2092004 and EP2092015 disclose high melt flow polypropylene polymers blended with other thermoplastic, olefin elastomers or plastomers and glass fiber fillers for improved processability and mechanical properties.

The automotive industry imposes increasingly stringent requirements for thermoplastic parts. It would be desirable to develop new composite materials for molded articles that retain or improve the advantages of known blends, notably impact/stiffness balance, without a deterioration of their processability and shrinkage. It is highly desirable to obtain formulation with low densities and reduced weights.

SUMMARY OF THE INVENTION

The present technology relates to compositions having a melt flow rate (MFR), measured according to ISO 1133 with a load of 2.16 kg at 230° C. from 2 to 100 g/10 min, including from 2 to 20 g/10 min, comprising:
A) from 30 to 60% by weight, including from 40 to 55% by weight, of a polyolefin composition comprising:
  a) 10-50% by weight, such as 20-40% or 25-35% by weight, of a copolymer of propylene with one or more comonomer(s) selected from ethylene and $CH_2$=CHR alpha-olefins, where R is a 2-8 carbon alkyl, which copolymer contains from 1 to 8% by weight, such as from 1 to 5% by weight, of comonomer(s), including from 1 to 4.5% by weight when the sole comonomer is ethylene;
  b) 50-90% by weight, such as 60-80% and 65-75% by weight, of a copolymer of ethylene and (i) propylene or (ii) other $CH_2$=CHR alpha-olefin(s), where R is a 2-8 carbon alkyl radical, or (iii) a combination thereof, optionally with minor amounts of a diene, containing from 50 to 80% by weight, including from 55 to 75% by weight of ethylene;
  wherein the weight ratio α/XS of the content B of copolymer component (B) to the fraction XS soluble in xylene at room temperature (about 25° C.), both (B and XS) referred to the total weight of (A)+(B), is 1.5 or less, such as 1.4 or less or in a range of from 0.8 to 1.5 or from 0.8 to 1.4, and the intrinsic viscosity [η] of the XS fraction is 3 dl/g or more, for instance from 3.5 to 7 dl/g.
B) from 5 to 30% by weight, including from 10 to 20% by weight, of a glass fiber filler;
C) from 0 to 5% by weight, including from 0.5 to 3% by weight, of a compatibilizer;
D) from 10 to 40% by weight, including from 15 to 35% by weight, of a polypropylene component selected from propylene homopolymers, propylene copolymers containing up to 5% by moles of ethylene and/or $C_4$-$C_{10}$ α-olefin(s) and combinations of such homopolymers and copolymers.

DETAILED DESCRIPTION OF THE INVENTION

The total quantity of copolymerized ethylene is from 30% to 65% by weight, such as from 40% to 60% by weight and from 40% to 55% by weight. The composition component (A) may contribute at least one differential scanning calorimetry (DSC) melt peak, at a temperature higher than 120° C. but equal to or lower than 150° C., such as from 135 to 148° C. The melt flow rate (MFR), as measured according to ISO 1133 with a load of 2.16 kg at 230° C. of the polypropylene component D), may be from 0.3 to 2500 g/10 min, such as from 70 to 2500 g/10 min, from 500 to 2500 g/10 min, and from 1200 to 2500 g/10 min.

In some embodiments, Component A) has one or more of the following features:
  Gloss values equal to or lower than 15%, including equal to or lower than 10% and equal to or lower than 5% (measured at 45° according to ASTM D523 on 1 mm extruded sheets);
  Gloss values equal to or lower than 80%, such as equal to or lower than 50% and equal to or lower than 40% (measured at 60° according to ASTM D2457 on injection molding plaques of 1 mm thickness);
  Shore A values equal to or lower than 90, such as from 80 to 90;
  Shore D values equal to or lower than 35, such as from 35 to 15;
  MFR values, measured according to according to ISO 1133 with a load of 2.16 kg at 230° C., of from 0.01 to 10 g/10 min, such as from 0.05 to 5 g/10 min;
  flexural modulus values equal to or lower than 200 MPa, such as from 50 to 150 MPa;
  stress at break values from 5 to 25 MPa;
  elongation at break values higher than 400%;
  minimal or no whitening (blush) when bending a plaque 1 mm thick;
  an amount of fraction soluble in xylene at room temperature (XS) from 40 to 70% by weight, such as from 45 to 65% by weight, referred to the total weight of (A); and
  an isotacticity index (II) of component (a) equal to or higher than 90%.

The component A) can be produced with polymerization processes carried out in the presence of stereospecific Ziegler-Natta catalysts supported on magnesium dihalides as described in WO2007/042375, for instance using compositions with less than 20% by weight of component B) and having a low density, such as a density of equal to or lower than 1 g/cm$^3$, such as from 0.995 to 1.000 g/cm$^3$.

In certain embodiments, the filler components B) to be used in the compositions of the present technology are fibers made of glass. The glass fibers may be either cut glass fibers or long glass fibers, or may be in the form of continuous filament fibers, where cut glass fibers may also be known as short fibers or chopped strands, where the glass fibers have a length of from 1 to 50 mm.

The cut or short glass fibers used in the compositions of the present technology have, in some embodiments, a length of from 1 to 6 mm, such as from 3 to 4.5 mm, and a diameter of from 10 to 20 μm, for instance from 12 to 14 μm. The polypropylene compositions of the present technology, in certain embodiments, can also comprise a compatibilizer C) such as low molecular weight compounds having reactive polar groups, which serve to make the fillers and pigments less hydrophilic and therefore more compatible with the polymer. These compounds may be selected from silanes such as aminosilanes, epoxysilanes, amidosilanes or acrylosilanes.

In further embodiments, the compatibilizer comprises a modified (functionalized) polymer and optionally a low molecular weight compound having reactive polar groups. Modified olefin polymers, such as propylene homopolymers and copolymers, like copolymers of ethylene and propylene with each other or with other alpha olefins, may be used, as they are highly compatible with the polymeric component of the compositions of the present technology. Modified polyethylene can be used as well. The modified polymers, in certain embodiments, may be selected from graft or block copolymers including polymers containing groups derived from polar compounds such as acid anhydrides, carboxylic acids, carboxylic acid derivatives, primary and secondary amines, hydroxyl compounds, oxazoline and epoxides, and ionic compounds.

Specific examples of polar compounds for use in the present technology are unsaturated cyclic anhydrides, their aliphatic diesters and their diacid derivatives. In non-limiting examples, these compounds may be selected from maleic anhydride, $C_1$-$C_{10}$ linear and branched dialkyl maleates, $C_1$-$C_{10}$ linear and branched dialkyl fumarates, itaconic anhydride, $C_1$-$C_{10}$ linear and branched itaconic acid dialkyl esters, maleic acid, fumaric acid, itaconic acid and mixtures thereof.

While in no way limiting the present technology to any particular theory, the low molecular weight compound may serve to couple the filler to the modified polymer and bind it securely to the propylene polymer components. These compounds may be, in certain embodiments, bifunctional compounds, in which the first functional group can enter into a binding interaction with the filler and the second functional group can enter into a binding interaction with the modified polymer. The low molecular weight compound is, in some embodiments, an amino- or epoxysilane. The aminosilanes can bond with the silane hydroxyl groups to the glass fiber, while the amino groups form a stable amide bond, for example with polypropylene grafted with maleic anhydride. In certain embodiments, the low molecular weight compound may be applied to the glass fibers before being incorporated into the composition. The modified polymer can be produced by the reactive extrusion of the polymer, for example with maleic anhydride in the presence of free radical generators such as organic peroxides as disclosed in EP Pat. Doc. No. EP0572028. The amounts of groups deriving from polar compounds in the modified polymers are, in some embodiments, from 0.5 to 3% by weight, while the MFR values for the modified polymers are, in certain embodiments from 50 to 400 g/10 min. It is also possible to use a masterbatch which comprises the fillers and the compatibilizer in premixed form.

In some embodiments, component D) is a high melt flow rate component. The MFR value of D) can result from mixing various propylene homopolymers and/or copolymers with different MFR values. For instance, in the case of two polymer components $D^1$ and $D^2$, the MFR of component D ($MFR^D$) can be expressed as follows:

$$MFR^D = [W_D^1/(W_D^1+W_D^2)] \times \ln MFR^1 + [W_D^2/(W_D^1+W_D^2)] \times \ln MFR^2$$

wherein $W_D^1$ and $W_D2$ represent the weight of components $D^1$) and $D^2$) respectively, while $MFR^D$ represent the calculated value of MFR for D) and $MFR^1$ and $MFR^2$ represent the MFR of components $D^1$) and $D^2$), respectively.

When combinations (blends) of propylene homopolymers and/or copolymers are used as polypropylene component D), in certain embodiments at least two homopolymers and/or copolymers with different MFR values may be used, where the difference is at least 3 g/10 min, such as at least 10 g/10 min. In particular, when the MFR of the polypropylene component D) is less than 500 g/10 min, for instance from 0.3 to 450 g/10 min, component D) can comprise two polymer fractions $D^I$) and $D^{II}$) selected from propylene homopolymers and copolymers, wherein fraction $D^{II}$) has a higher MFR value with respect to $D^I$), with a difference of the MFR values as described above. In some embodiments, fraction $D^{II}$) has a MFR value from 500 to 2500 g/10 min, such as from 1200 to 2500 g/10 min. In further embodiments, the amounts of these fractions are from 5 to 80% by weight of $D^I$) and 20 to 95% by weight of $D^{II}$), including from 10 to 70% by weight of $D^I$) and 30 to 90% by weight of $D^{II}$) with respect to the total weight of D).

Moreover, MFR values can be obtained without any degradation treatment, where the polypropylene component D) is made of as-polymerized propylene polymers and not subjected after polymerization to any treatment able to measurably change the MFR value. The molecular weights of the polypropylene component D) are those directly obtained in the polymerization process used to prepare the propylene polymers. Alternatively, the MFR values may be obtained by degradation (visbreaking) of propylene polymers having lower MFR values. All the MFR values for the polypropylene component D) are measured according to ISO 1133 with a load of 2.16 kg at 230° C. The comonomers in the propylene copolymers that can be present in the polypropylene component D) are selected from ethylene and/or $C_4$-$C_{10}$ α-olefins, for example butene-1, pentene-1, 4-methylpentene-1, hexene-1 and octene-1.

All propylene polymers and copolymers of the polypropylene component D) can be prepared using a Ziegler-Natta catalyst or a metallocene-based catalyst system in the polymerization process. The catalysts and the polymerization processes are known in the art. Detailed descriptions of the processes and conditions can be found in WO2010/069998, which is incorporated by reference and describes the processes for producing components $D^I$ and $D^{II}$.

The polypropylene compositions according to the present disclosure are obtainable by melting and mixing the components, where the mixing is effected in a mixing apparatus at temperatures from 180 to 320° C., such as from 200 to 280° C. and from 200 to 260° C. Useful mixing apparatus in this context are in particular extruders or kneaders including twin-screw extruders. It is also possible to premix the components at room temperature in a mixing apparatus. In certain embodiments, the polymeric components component A) and D) and optionally component C) may be melted and subsequently mixed with component B) in order to reduce the abrasion in the mixing apparatus and the fiber breakage.

During the preparation of the polypropylene compositions of the present technology, besides the main components A), B) and D) and optionally C), it is possible to introduce additional additives employed in the art, such as stabilizing agents (against heat, light, UV et al.), plasticizers, antistatic and water repellant agents. In certain embodiments, the amount of such additives (addpack) is less than 10 wt % with respect to the total weight of the composition.

Due to their favorable balance of properties, the compositions of the present technology can be used in many applications, including but not limited to injection molded articles for automotive, electrical appliances, furniture, and formed articles such as sheets, parts for electrical appliances, furniture, and housewares, as well as masterbatches.

The following examples are given for illustrating but not limiting purposes.

EXAMPLES

The following analytical methods are used to determine the properties reported in the description and in the examples.

Melt Flow Rate (MFR): ISO 1133 with a load of 2.16 kg at 230° C.;

Intrinsic Viscosity: Measured in tetrahydronaphthalene at 135° C.;

Density: ISO 1183;

T-bar preparation (injection molded): Test specimens were injection moulded according to Test Method ISO 1873-2 (1989).

Flexural Modulus (secant): ISO 178 on rectangular specimens 80×10×4 mm from T-bars ISO527-1 Type 1A;

Tensile Modulus (secant): ISO 527/-1, -2 on specimens Type 1A with velocity of 1 mm/min, span of 50 mm;

Charpy notched: ISO 179 (type 1, edgewise, Notch A) on rectangular specimens 80×10×4 mm from T-bars ISO527-1 Type 1A;

Tensile Strength (stress) at Break: ISO 527/-1, -2 on specimens Type 1A with velocity of 50 mm/min, span of 50 mm;

Elongation (strain) at Break: ISO 527/-1, -2 on specimens Type 1A with velocity of 50 mm/min, span of 50 mm;

HDT (455 kPa): (heat deflection temperature) ISO 75A-1. -2 on specimens clause 6;

HDT (1820 kPa): (heat deflection temperature) DIN 1820

Determination of Isotacticity Index (solubility in xylene at room temperature, in % by weight): 2.5 g of polymer and 250 cm$^3$ of xylene are introduced in a glass flask equipped with a refrigerator and a magnetic stirrer. The temperature is raised over 30 minutes to the boiling point of the solvent. The resulting clear solution is kept under reflux and stirred for an additional 30 minutes. The closed flask is then kept for 30 minutes in a bath of ice and water and in a thermostatic water bath at 25° C. for 30 minutes. The resulting solid is filtered on quick filtering paper. 100 cm$^3$ of the filtered liquid is poured in a previously weighed aluminum container, which is heated on a heating plate under nitrogen flow to remove the solvent by evaporation. The container is then kept in an oven at 80° C. under vacuum until a constant weight is obtained. The weight percentage of polymer soluble in xylene at room temperature is then calculated.

The percent by weight of polymer insoluble in xylene at room temperature (about 25° C.) is considered the isotacticity index of the polymer. This value corresponds to the isotacticity index determined by extraction with boiling in n-heptane, which by definition constitutes the isotacticity index of polypropylene.

Polydispersity Index (PI):

This measurement accounts for the molecular weight distribution of the polymer. To determine the PI value, the modulus separation at a low modulus value, e.g. 500 Pa, is determined at a temperature of 200° C. by using a Rheometrics RMS-800 parallel plate rheometer, operating at an oscillation frequency that increases from 0.01 rad/second to 100 rad/second. From the modulus separation value, the PI can be derived using the following equation:

$$PI = 54.6 \times (\text{modulus separation}) - 1.76$$

where the modulus separation (MS) is defined as:
MS=(frequency at G'=500 Pa)/(frequency at G"=500 Pa), where G' is the storage modulus and G" is the low modulus.

Molecular Weight Distribution (MWD) Determination:

The Mn and Mw values are measured by way of gel permeation chromatography (GPC) at 145° C. using an Alliance GPCV 2000 instrument (Waters) equipped with three (3) TosoHaas TSK GMHXL-HT mixed-bed columns having a particle size of 13 p.m. The dimensions of the columns are 300×7.8 mm. Vacuum distilled 1,2,4-Trichlorobenzene (TCB) is used as the mobile phase and the flow rate is 1.0 ml/min. The sample solution is prepared by heating and stirring at 145° C. in TCB for two hours. The concentration is 1 mg/ml. To prevent degradation, 0.1 g/l of 2,6-diterbutyl-p-cresol is added. 326.5 µL of solution are injected into the column set. A calibration curve is obtained using 10 polystyrene standard samples (EasiCal kit by Polymer Laboratories) with molecular weights in a range from 580 to 7500000; additionally, two other standards with peak molecular weights of 11600000 and 13200000 from the same manufacturer are included. It is assumed that the K values of the Mark-Houwink relationship are:

$K=1.21\times 10^{-4}$ dL/g and $\alpha=0.706$ for the polystyrene standards;

$K=1.90\times 10^{-4}$ dL/g and $\alpha=0.725$ for the polypropylene samples;

$K=1.93\times 10^{-4}$ dL/g and $\alpha=0.725$ for the propylene copolymer samples.

A third order polynomial equation is used to interpolate the experimental data and obtain the calibration curve. Data acquisition and processing is done by using Empower 1.0 with a GPCV option by Waters.

Melting Temperature (Tm DSC):

Determined by DSC according ISO 3146 with a heating rate of 20K per minute.

MAII:

According to ISO 6603.

Longitudinal and Transversal Thermal Shrinkage:

A plaque of 100×195×2.5 mm is moulded in an injection moulding machine "SANDRETTO Serie 7 Demag 160" (where 160 stands for 160 tons of clamping force).

The injection conditions are:

Melt temperature=220° C.

Mold temperature=30° C.

Injection time=11 seconds

Holding time=30 seconds
Screw diameter=50 mm

The plaque is measured 48 hours after moulding, through callipers, and the shrinkage is given by:

Longitudinal shrinkage=((195−read_value)/195)×100

Transversal shrinkage=((100−read_value)/100)×100 where:
195 is the length (in mm) of the plaque along the flow direction, measured immediately after moulding;
100 is the length (in mm) of the plaque crosswise the flow direction, measured immediately after moulding; and
the read_value is the plaque length in the relevant direction.

Examples 1, 2 and 3 and Comparative Reference Examples 1 and 2

The following materials are used as components A), B) and C) and D):

Component A)

The solid catalyst component used in the polymerization of component A) are produced and operated likewise in Example 1 of WO 2007/042375. The catalyst is a highly stereospecific Ziegler-Natta catalyst component supported on magnesium chloride, containing about 2.2% by weight of titanium and diisobutylphthalate as an internal donor and prepared as described in Example 3 of EP Published Patent Application No. 395083. After a prepolymerization stage where the catalyst is contacted with triethylaluminum (TEAL) and dicyclopentyldimethoxysilane (DCPMS) and prepolymerized as described in WO 2007/042375. The catalyst is introduced into a first gas phase polymerization reactor where a propylene copolymer (matrix) is produced.

In a second and eventually a third reactor at least one propylene/ethylene copolymer (bipo-rubber component(s)) is/are produced. Polymerization conditions, molar ratio of the reactants and composition of the copolymers obtained are shown in Table 1 for component A) HECO-1.

The characteristics relating to the polymer compositions, reported in Table 1, are obtained from measurements carried out on the extruded polymer exiting the reactor(s). For comparison purposes, Table 1 reports the properties of a polyolefin composition Comparative HECO-2 prepared by sequential polymerization in three stages. HECO2 has been subjected to extrusion/granulation in the presence of 600 ppm by weight peroxide to reach the final MFR reported in Table 1. The peroxide was introduced by using the masterbatch PERGAPROP HX10 PP, which contains 10% by weight of the liquid peroxide 2,5-bis(tert-butylperoxy)-2,5-dimethylhexane in a polypropylene carrier.

TABLE 1

| Component | | A (comparative) HECO2 | A HECO1 | $D^{II}$ PP-1 | $D^{I}$ (Comparative) HECO3 | $D^{I}$ PP-2 |
|---|---|---|---|---|---|---|
| $1^{st}$ Reactor operating conditions/matrix properties | | | | | | |
| Temperature | °C. | 60 | 72 | | | |
| Pressure | bar(g) | 18 | 18 | | | |
| H2/C3− | mol. | 0.038 | 0.13 | | | |
| C2−/(C2− + C3−) | mol. | 0.03 | 0.025 | | | |
| Split | wt % | 21 | 28.5 | 100 | 55 | 100 |
| C2− content (copolymer) | wt % | 3.25 | 2.5 | — | | |
| MFR | g/10' ISO 1133 | 5.5 | 35 | 1800 | 30 | 9.5 |
| Tm DSC | | 141 | 145 | 153 | 163 | 163 |
| PI | | 4.5 | 4.5 | | 6 | 4.5 |
| $2^{nd}$/3rd Reactor operating conditions/bipo-rubber properties | | | | | | |
| Temperature | °C. | 64/60 | 65 | | | |
| Pressure | bar(g) | 18 | 16 | | | |
| H2/C2− | mol. | 0.015/0.009 | 0.06 | | | |
| C2−/(C2− + C3−) | mol. | 0.16/0.21 | 0.42 | | | |
| Split | wt % | 49.5/29.5 | 71.5 | | 45 | — |
| C2− content (copolymer) | wt % | 28/38 | 58 | | 12 | — |
| Final Polymer properties | | | | | | |
| Total comonomer content | wt % | 25.7 | 42.2 | | 5.5 | — |
| Xylene Soluble | wt % | 73 | 57 | | 11 | 3.0 |
| X.S.I.V. | dl/g | | 4.15 | | 2.7 | |
| Density | | 0.87 | 0.88 | 0.98 | 0.9 | 0.9 |
| MFR L | g/10' ISO 1133 | 2.8 | 0.5 | 1800 | 18 | 9.5 |
| Flexural Modulus | MPa ISO 178 | 35 | 130 | 1350 | 1650 | 1550 |
| Stress at break | MPa ISO 527 | 7 | 6.97 | | 19 | |
| Elongation/strain at break | % ISO 527 | 470 | 470 | | 29 | |

TABLE 1-continued

| Component | | | A (comparative) HECO2 | A HECO1 | $D^{II}$ PP-1 | $D^I$ (Comparative) HECO3 | $D^I$ PP-2 |
|---|---|---|---|---|---|---|---|
| Gloss at 60° | % | ASTMD 2457 | 85 | 36 (4% - 45°) | | | |
| Shore A | | ISO 868 | 76 | 87 | | | |
| B/XS | | | 1.08 | 1.25 | | | |

Component D)

PP-1 is a very high melt flow polypropylene homopolymer component ($D^{II}$). The propylene homopolymer has a MFR of 1800 g/10 min, Mw/Mn of 2.6, ad isotacticity index in xylene at room temperature of 98.5% (isotactic pentades (mmmm) higher than 92%), a DSC melting temperature of 153° C. and an intrinsic viscosity (measured on the polymer as such) of 0.52 dl/g, in the form of pellets.

PP-2 is a homopolymer component ($D^I$) having a MFR of 9.5, an isotacticity index in xylene at room temperature of 3%, a DSC melting temperature of 163° C. and an intrinsic viscosity (measured on the polymer as such) of 1.7 dl/g, in the form of flakes.

HECO-3 is a comparative component ($D^I$) and is a heterophasic propylene copolymer. HECO-3 is a high crystalline impact copolymer for high stiffness, injection molding applications, having a MFR of 18 g/10 min (ISO 1133, load of 2.16 kg at 230° C.), a flexural modulus 1650 MPa and the additional properties reported in Table 1.

Component B)

GF (glass fibers): White ECS 03T 480 (Nippon Electric Glass Company Ltd), with a fiber length of 3 mm and a diameter of 13 μm.

Component C)

PP-MA: Propylene homopolymer grafted with maleic anhydride (MA), with a MFR of 430 g/10 min (ISO 1133, load of 2.16 kg at 230° C.); and a MA level (high) in a range of 0.5 to 1.0 wt % (Exxelor PO 1020, sold by ExxonMobil).

The compositions also contain conventional additives as indicated in Table 1. The compositions are prepared by extrusion, using a twin screw extruder (Werner & Pfleiderer ZSK40SC). The line has a process length of approximately 48 L/D and is provided with gravimetric feeders. Components A), C) and D) are fed into the first barrel and component B) is fed into the fourth barrel via forced side feeding. A strand die plate with cooling bath and strand cutter (Scheer SGS100) is used to form pellets. Vacuum degassing (barrel No. 9) is also applied to extract fumes and decomposition products.

The operating conditions are as follows:

Screw speed: 300 rpm;

Capacity: 40-50 kg/h;

Barrel Temperature: 200-240° C.

The final properties of the resulting composition are reported in Table 2, along with the relative amounts of the components.

TABLE 2

| | | Example | | | | |
|---|---|---|---|---|---|---|
| | | Reference 1 | 1 | 2 | Reference 2 | 3 |
| HECO-2 | wt % | 41 | | | 28 | |
| HECO-1 | wt % | | 42 | 42 | | 48 |
| PP-1 | wt % | 16 | 17 | 27 | 15 | 33 |
| HECO-3 | wt % | | | | 38 | |
| Glass Fibers GF | wt % | 25 | 25 | 15 | 12 | 13 |
| PP-MA | wt % | 1 | 1 | 1 | 1 | 1 |
| PP-2 | wt % | 9.5 | 11 | 11 | | |
| Irgafos 168 | wt % | 0.2 | 0.2 | 0.2 | 0.2 | 0.2 |
| Irganox 1076 | wt % | 0.2 | 0.2 | 0.2 | 0.2 | 0.2 |
| Cyasorb UV-3853 S | wt % | 0.1 | 0.1 | 0.1 | 0.2 | 0.1 |
| Zinc oxide | wt % | 0.2 | 0.2 | 0.2 | 0.2 | 0.2 |
| Talc HM05 C | wt % | 1 | 1 | 1 | 1 | 1 |
| Crodamid ER | wt % | | 0.15 | 0.15 | | 0.15 |
| MB50-001 (silicone-MB) | wt % | | | | 1 | |
| Pigments and flakes | wt % | 5.8 | 2.15 | 2.15 | 3.2 | 3.15 |
| Total addpack wt % | wt % | 7.5 | 4 | 4 | 6 | 5 |
| Total composition wt % | wt % | 100 | 100 | 100 | 100 | 100 |
| HECO-2 (A) comparative | wt % | 44.3 | 0.0 | 0.0 | 29.8 | 0.0 |
| HECO-1 (A) | wt % | 0.0 | 43.8 | 43.8 | 0.0 | 50.5 |
| ($D^{II}$) | wt % | 17.3 | 17.7 | 28.1 | 16.0 | 34.7 |
| ($D^I$) comparative | wt % | 0.0 | 0.0 | 0.0 | 40.4 | 0.0 |
| Glass Fibers (B) | wt % | 27.0 | 26.0 | 15.6 | 12.8 | 13.7 |
| (C) | wt % | 1.1 | 1.0 | 1.0 | 1.1 | 1.1 |
| ($D^I$) | wt % | 10.3 | 11.5 | 11.5 | 0.0 | 0.0 |
| Total wt % recalculated based on the sum of A + B + C + D* | wt % | 100 | 100 | 100 | 100 | 100 |

TABLE 2-continued

| Property | Method | Unit | Example Ref. 1 | Example 1 | Example 2 | Example Ref. 2 | Example 3 |
|---|---|---|---|---|---|---|---|
| Density | | | 1.09 | 1.09 | 1.0 | 0.99 | 0.99 |
| MFR (230° C., 2.16 kg) | ISO 1133 | g/10 min | 6.8 | 2.7 | 6.5 | 11.6 | 11.5 |
| HDT A at 1820 kPa | DIN 53461 | ° C. | 80.5 | 105.2 | 103.7 | 94.9 | 77.6 |
| HDT B at 455 kPa | ISO 75 | ° C. | 133 | 140.9 | 140.3 | 143.3 | 131.6 |
| Flexural modulus | ISO 178 | MPa | 2384 | 3605 | 2713 | 2260 | 2132 |
| Tensile chord modulus | ISO 527 | Mpa | 2418 | 3444 | | 2365 | 2102 |
| Impact notched | ISO 179/1eA | kJ/m$^2$ | | | | | |
| At Room Temperature (RT) | | kJ/m$^2$ | 35.5 | 29.1 | 16.8 | 16.6 | 16.3 |
| At -30° C. | | kJ/m$^2$ | 8.6 | 12.6 | 8 | 7.1 | 6 |
| MAII @ RT | ISO 6603 | | | | | | |
| F (max) | | N | 2237 | 1902 | 1498 | 1516 | 1869 |
| E (F max) | | J | 8.7 | 5.9 | 5 | 6.8 | 6.4 |
| E (total) | | J | 17.9 | 15 | 11.1 | 10.7 | 12 |
| Breakage on samples | | | 10 d | 10 d/b | 10 d/b | 7 d/b 3 b | 10 d/b |
| MAII @ -30° C. | ISO 6603 | | | | | | |
| F (max) | | N | 1587 | 1703 | 1361 | 1370 | 1108 |
| E (F max) | | J | 5.1 | 5.6 | 3.8 | 4.2 | 3.4 |
| E (total) | | J | 5.6 | 6.5 | 4.7 | 4.7 | 4.3 |
| Breakage on samples | | | 10 b | 6 b. 4 d/b | 10 b | 10 b | 10 b |
| Shrinkage (48 hours (h)/RT at P = 40 bar) | See above | % | | | | | |
| Longitudinal | | % | 0.14 | 0.18 | 0.27 | 0.33 | 0.32 |
| Transversal | | % | 0.76 | 0.86 | 0.87 | 0.78 | 0.83 |
| Shrinkage (48 h/80° C. P = 40 bar) | ISO 2554 | | | | | | |
| Longitudinal | | % | 0.05 | 0.07 | 0.09 | 0.09 | 0.07 |
| Transversal | | % | 0.11 | 0.07 | 0.1 | 0.1 | 0.13 |

*D = $D^I$ + $D^{II}$

What is claimed is:

1. A composition having a melt flow rate, measured according to ISO 1133 with a load of 2.16 kg at 230° C., from 2 to 100 g/10 min, the composition comprising:
   A) from 30 to 60% by weight of a polyolefin composition comprising:
   a) 10-50% by weight of a copolymer of propylene with one or more comonomer(s) selected from ethylene and CH2=CHR alpha-olefins, where R is a 2-8 carbon alkyl, which copolymer contains from 1 to 8% of comonomer(s);
   b) 50-90% by weight of a copolymer of ethylene and (i) propylene or (ii) other CH2=CHR alpha-olefin(s), where R is a 2-8 carbon alkyl radical, or (iii) a combination thereof, optionally with a diene, containing from 50 to 80% by weight of ethylene;
   wherein the weight ratio a/XS of the content b of copolymer component (b) to the fraction XS soluble in xylene at room temperature (about 25° C.), both (b and XS) referred to the total weight of (a)+(b), is 1.5 or less, and the intrinsic viscosity [η] of the XS fraction is 3 dl/g or more; and the total quantity of copolymerized ethylene is from 30% to 65% by weight;
   B) from 5 to 30% by weight of a glass fiber filler;
   C) from 0.5 to 3% by weight of a compatibilizer;
   D) from 10 to 40% by weight of a polypropylene component selected from propylene homopolymers, propylene copolymers containing up to 5% by moles of ethylene and/or C4-C10 α-olefin(s) and combinations thereof, where the melt flow rate, measured according to ISO 1133 with a load of 2.16 kg at 230° C. of the polypropylene component D), is from 0.3 to 2500 g/10 min.

2. An injection molded, extruded or thermoformed article comprising the composition of claim 1.

3. A concentrate comprising the composition of claim 1.

UNITED STATES PATENT AND TRADEMARK OFFICE
CERTIFICATE OF CORRECTION

PATENT NO. : 9,428,637 B2
APPLICATION NO. : 14/903000
DATED : August 30, 2016
INVENTOR(S) : Rainer Kohler et al.

Page 1 of 2

It is certified that error appears in the above-identified patent and that said Letters Patent is hereby corrected as shown below:

On the Title Page

Column 1,
Item (30)    Line 1    Delete "13175408" and insert --13175408.7--

In the Specification

| | | |
|---|---|---|
| Column 2 | Line 8 | Delete "α/XS" and insert --B/XS-- |
| Column 2 | Line 14 | Delete "dl/g." and insert --dl/g;-- |
| Column 4 | Line 19 | Delete "$W_D2$" and insert --$W_D^2$-- |
| Column 5 | Line 1 | Delete "180 to 320° C," and insert --180 °C to 320 °C,-- |
| Column 5 | Line 1 | Delete "200 to 280° C" and insert --200 °C to 280 °C-- |
| Column 5 | Line 2 | Delete "200 to 260° C" and insert --200 °C to 260 °C-- |
| Column 5 | Line 41 | Delete "ISO527-1" and insert --ISO 527-1-- |
| Column 5 | Line 46 | Delete "ISO527-1" and insert --ISO 527-1-- |
| Column 5 | Line 52 | Delete "75A-1. -2" and insert --75A-1, -2-- |
| Column 5 | Line 54 | After "1820", insert --.-- |
| Column 6 | Line 25 | Delete "Mn and Mw" and insert --$M_n$ and $M_w$-- |
| Column 6 | Line 29 | Delete "13 p.m." and insert --13 μm.-- |
| Column 6 | Line 43 | Delete "dL/g" and insert --dl/g-- |
| Column 6 | Line 46 | Delete "dL/g" and insert --dl/g-- |
| Column 6 | Line 49 | Delete "dL/g" and insert --dl/g-- |
| Column 8 | Line 3 | Delete "HECO2" and insert --HECO-2-- |
| Column 8 | Line 3 | Delete "HECO1" and insert --HECO-1-- |
| Column 8 | Line 3 | Delete "HECO3" and insert --HECO-3-- |
| Column 8 | Line 7 | Delete "H2/C3-" and insert --$H_2/C_3^-$-- |
| Column 8 | Line 8 | Delete "C2-/(C2- + C3-)" and insert --$C_2^-/(C_2^- + C_3^-)$-- |
| Column 8 | Line 10 | Delete "C2-" and insert --$C_2^-$-- |
| Column 8 | Line 16 | Delete "2nd/3rd" and insert --$2^{nd}/3^{rd}$-- |
| Column 8 | Line 19 | Delete "H2/C2-" and insert --$H_2/C_2^-$-- |

Signed and Sealed this
First Day of January, 2019

Andrei Iancu
*Director of the United States Patent and Trademark Office*

CERTIFICATE OF CORRECTION (continued)
U.S. Pat. No. 9,428,637 B2

| | | |
|---|---|---|
| Column 8 | Line 20 | Delete "C2-/(C2- + C3-)" and insert --$C_2^-/(C_2^- + C_3^-)$-- |
| Column 8 | Line 21 | Delete "HECO2" and insert --HECO-2-- |
| Column 8 | Line 22 | Delete "C2-" and insert --$C_2^-$-- |
| Column 9 | Line 3 | Delete "HECO2" and insert --HECO-2-- |
| Column 9 | Line 3 | Delete "HECO1" and insert --HECO-1-- |
| Column 9 | Line 3 | Delete "HECO3" and insert --HECO-3-- |
| Column 9 | Line 17 | Delete "Mw/Mn" and insert --$M_w/M_n$-- |
| Column 10 | Line 35 | Delete "200-240° C" and insert --200 °C-240 °C-- |
| Column 11 | Line 15 | Delete "@" and insert --at-- |

In the Claims

| | | |
|---|---|---|
| Column 11 | Line 43 | In Claim 1, delete "CH2=CHR" and insert --$CH_2$=CHR-- |
| Column 11 | Line 47 | In Claim 1, delete "CH2=CHR" and insert --$CH_2$=CHR-- |
| Column 11 | Line 51 | In Claim 1, delete "α/XS" and insert --b/XS-- |
| Column 12 | Line 44 | In Claim 1, delete "C4-C10" and insert --$C_4$-$C_{10}$-- |